US012496830B2

(12) United States Patent
Bandoh

(10) Patent No.: US 12,496,830 B2
(45) Date of Patent: Dec. 16, 2025

(54) HEAD MODULE AND LIQUID DISCHARGE APPARATUS

(71) Applicant: Yoshinori Bandoh, Kanagawa (JP)

(72) Inventor: Yoshinori Bandoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 149 days.

(21) Appl. No.: 18/421,999

(22) Filed: Jan. 25, 2024

(65) Prior Publication Data

US 2024/0316938 A1 Sep. 26, 2024

(30) Foreign Application Priority Data

Mar. 24, 2023 (JP) ................................ 2023-048103

(51) Int. Cl.
*B41J 2/175* (2006.01)
*B41J 2/045* (2006.01)

(52) U.S. Cl.
CPC ........... *B41J 2/175* (2013.01); *B41J 2/04531* (2013.01)

(58) Field of Classification Search
CPC . B41J 2/04531; B41J 2/175; B41J 2/18; B41J 2/195; H01M 4/0404; H01M 4/0419
See application file for complete search history.

(56) References Cited

U.S. PATENT DOCUMENTS 4,920,362 A * 4/1990 Cowger ............... B41J 2/17513 347/87
5,790,157 A * 8/1998 Higuma ............... B41J 2/17506 347/85
2013/0050346 A1 2/2013 Takeuchi et al.
2020/0156374 A1 5/2020 Bandoh
2020/0164644 A1 * 5/2020 Yoneta ................ B41J 2/14233
2020/0298582 A1 9/2020 Bandoh
2021/0094298 A1 4/2021 Bandoh
2021/0260874 A1 8/2021 Bandoh
2022/0143977 A1 5/2022 Bandoh

FOREIGN PATENT DOCUMENTS

JP 2017-105155 A 6/2017
JP 2021-049746 A 4/2021

OTHER PUBLICATIONS

U.S. Appl. No. 18/520,597, filed Nov. 28, 2023.

* cited by examiner

*Primary Examiner* — Anh T Vo
(74) *Attorney, Agent, or Firm* — XSENSUS LLP

(57) ABSTRACT

A head module includes a liquid discharge head, a liquid storage, and a heater. The liquid discharge head discharges a liquid in a first direction. The liquid storage stores the liquid. The liquid storage includes a first wall, a second wall opposite the first wall in a second direction intersecting the first direction, an inlet on one end of the liquid storage, an outlet on another end of the liquid storage, and multiple partitions. The inlet introduces the liquid to the liquid storage. The outlet feeds the liquid to the liquid discharge head. The multiple partitions extend from the first wall toward the second wall with gaps between tips of the multiple partitions and the second wall in the second direction, respectively. The multiple partitions are arranged at intervals in the first direction. The heater is disposed on the first wall to heat the liquid in the liquid storage.

10 Claims, 9 Drawing Sheets

FIG. 14
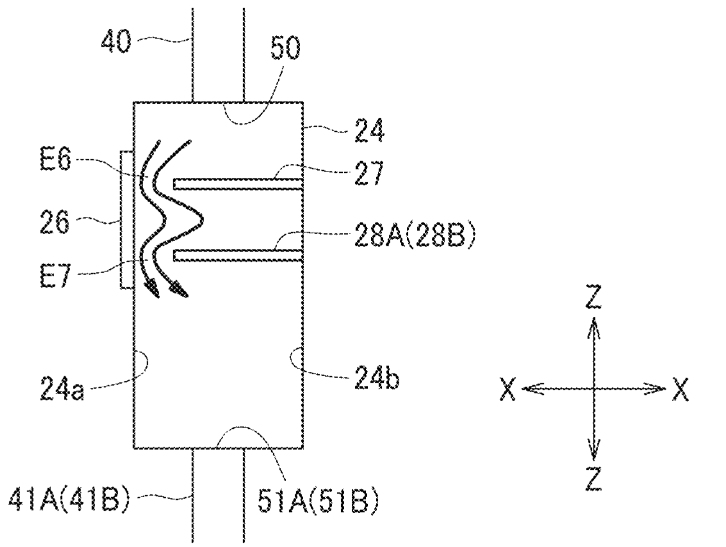
FIG. 15 COMPARATIVE EXAMPLE
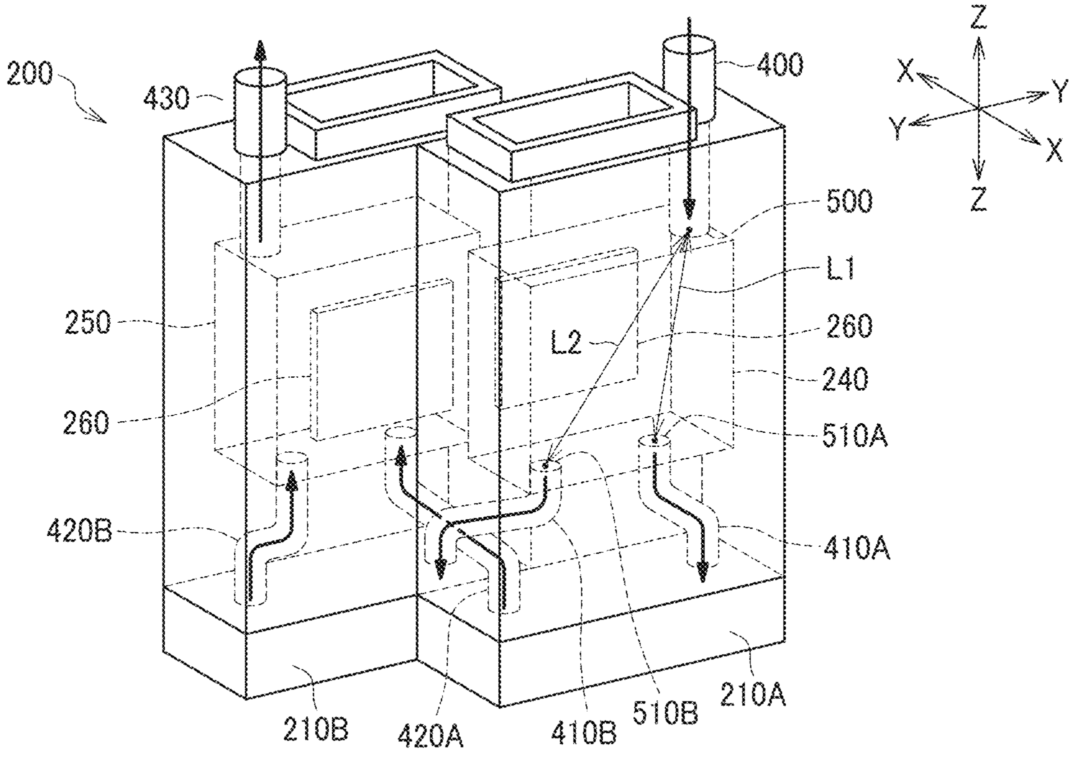

COMPARATIVE EXAMPLE

HEAD MODULE AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2023-048103, filed on Mar. 24, 2023, in the Japan Patent Office, the entire disclosure of which is hereby incorporated by reference herein.

BACKGROUND

Technical Field

Embodiments of the present disclosure relate to a head module and a liquid discharge apparatus.

Related Art

In the related art, a head module includes a liquid discharge head to discharge a liquid and a liquid storage such as a tank to store the liquid. The head module further includes a heater to heat the liquid storage in order to adjust the temperature of the liquid to be discharged from the liquid discharge head to an optimum temperature.

SUMMARY

Embodiments of the present disclosure describe an improved head module that includes a liquid discharge head, a liquid storage, and a heater. The liquid discharge head discharges a liquid in a first direction. The liquid storage is coupled to the liquid discharge head to store the liquid to be fed to the liquid discharge head. The liquid storage includes a first wall, a second wall opposite the first wall in a second direction intersecting the first direction, an inlet on one end of the liquid storage in the first direction, an outlet on another end of the liquid storage in the first direction, and multiple partitions. The inlet introduces the liquid to the liquid storage in the first direction. The outlet is coupled to the liquid discharge head to feed the liquid from the liquid storage to the liquid discharge head in the first direction. The multiple partitions extend from the first wall toward the second wall in the second direction with gaps between tips of the multiple partitions and the second wall in the second direction, respectively. The multiple partitions are arranged at intervals in the first direction. The heater is disposed on the first wall to heat the liquid in the liquid storage.

According to another embodiment of the present disclosure, there is provided a head module including a liquid discharge head, a liquid storage, and a heater. The liquid discharge head discharges a liquid in a first direction. The liquid storage is coupled to the liquid discharge head to store the liquid to be fed to the liquid discharge head. The liquid storage includes a first wall, a second wall opposite the first wall in a second direction intersecting the first direction, an inlet on one end of the liquid storage in the first direction, an outlet on another end of the liquid storage in the first direction, and a channel in which the liquid flows from the inlet toward the outlet in the liquid storage in the first direction. The inlet introduces the liquid to the liquid storage in the first direction. The outlet is coupled to the liquid discharge head to feed the liquid from the liquid storage to the liquid discharge head in the first direction. The channel has a first narrow portion, a wide portion wider than the first narrow portion in the second direction, and a second narrow portion narrower than the wide portion in the second direction, arranged in order of the first narrow portion, the wide portion, and the second narrow portion in the first direction. The heater is disposed on the first wall to heat the liquid in the liquid storage.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 14 is a side view of a supply tank of a head module according to an eighth embodiment of the present disclosure;

FIG. 15 is a perspective view of a head module according to a comparative example.

Figure 1:
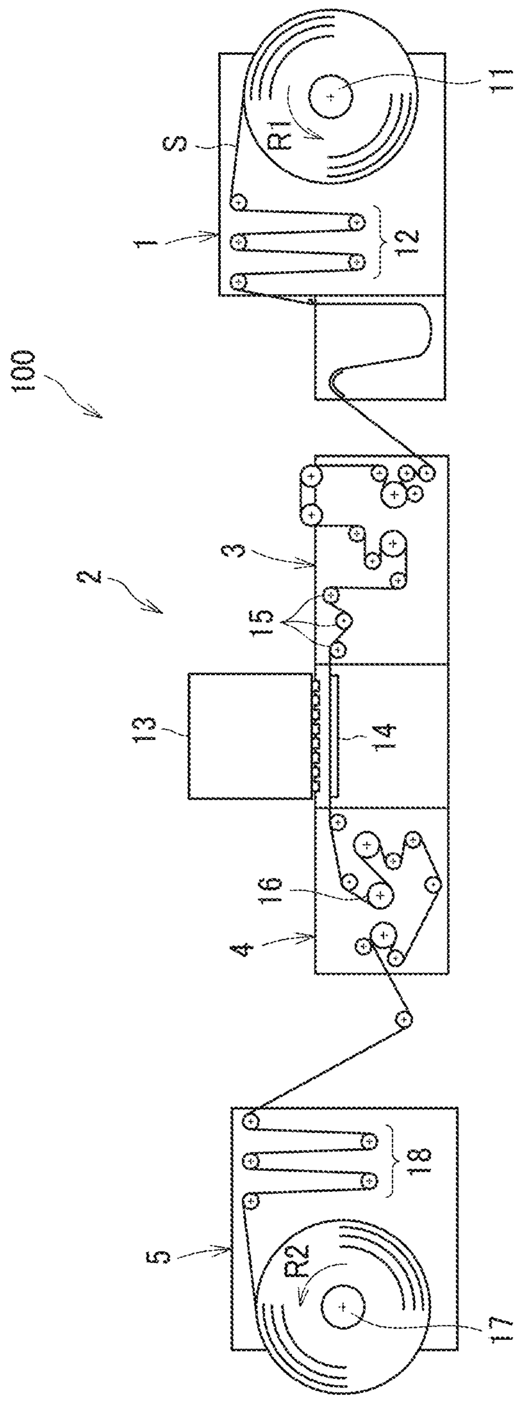
FIG. 1 is a diagram illustrating an overall configuration of an inkjet image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Embodiments of the present disclosure are described below with reference to the drawings. In the drawings, like reference signs denote like elements, and overlapping description may be simplified or omitted as appropriate.

Figure 2:
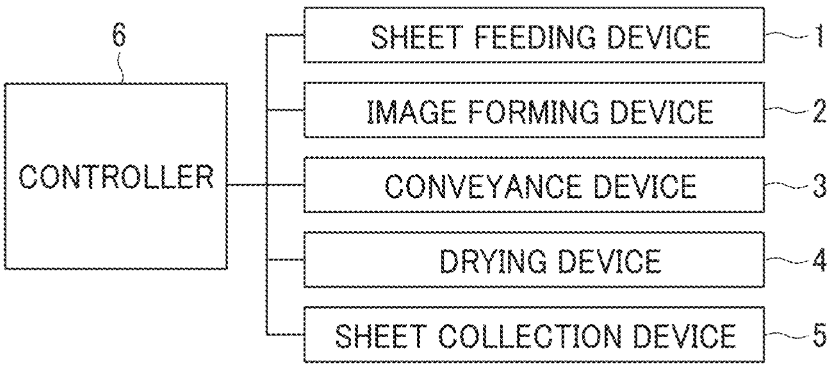
FIG. 2 is a block diagram of a control system of the inkjet image forming apparatus of FIG. 1, according to the present embodiment.

A configuration of an inkjet image forming apparatus, which is a liquid discharge apparatus according to an embodiment of the present disclosure, is described below with reference to FIGS. 1 and 2. FIG. 1 is a diagram illustrating an overall configuration of the inkjet image forming apparatus according to the present embodiment, and FIG. 2 is a block diagram of a control system of the inkjet image forming apparatus of FIG. 1.

As illustrated in FIG. 1, an image forming apparatus 100 according to the present embodiment includes a sheet supply device 1 that supplies a sheet S (i.e., an object) for image formation, an image forming device 2 that forms an image on the sheet S, a conveyance device 3 that conveys the sheet S to the image forming device 2, a drying device 4 that dry the sheet S, and a sheet collection device 5 that collects the sheet S on which an image is formed. The image forming apparatus 100 according to the present embodiment further includes a controller 6 (see FIG. 2) that controls the sheet supply device 1, the image forming device 2, the conveyance device 3, the drying device 4, and the sheet collection device 5.

The sheet supply device 1 includes a supply roller 11 around which the long sheet S is wound in a roll shape, and a tension adjustment mechanism 12 that adjusts tension applied to the sheet S. The supply roller 11 is rotatable in the direction indicated by arrow R1 illustrated in FIG. 1, and the sheet S is fed from the supply roller 11 as the supply roller 11 rotates. The tension adjustment mechanism 12 includes multiple rollers between which the sheet S is stretched to apply tension to the sheet S. Some of the multiple rollers move to adjust the tension of the sheet S, and the sheet S is fed from the supply roller 11 with a constant tension.

The image forming device 2 includes a head unit 13 as a liquid discharge unit that discharges ink (i.e., a liquid) onto the sheet S, and a platen 14 as a sheet support that supports the sheet S being conveyed. The head unit 13 includes multiple liquid discharge heads. Each of the multiple liquid discharge heads discharges ink onto the sheet S based on image data generated by the controller 6 to form an image on the sheet S. The ink according to the present embodiment is a liquid that contains a colorant, a solvent, and particles of crystalline resin dispersed in the solvent, and the crystalline resin undergoes a phase change and melts from a crystalline state into a liquid state when heated to a temperature equal to or higher than a certain melting point. The platen 14 faces the head unit 13 and supports the lower surface (back surface) of the sheet S supplied from the sheet supply device 1. The platen 14 approaches and separates from the head unit 13 so as to keep the distance between the head unit 13 and the sheet S constant.

The conveyance device 3 includes a plurality of conveyance rollers 15. The sheet S is conveyed to the image forming device 2 by the rotation of the conveyance rollers 15 while being stretched between the conveyance rollers 15. The conveyance device 3 may include other conveyors such as a conveyance belt.

The drying device 4 includes a heating drum 16 that heats the sheet S to dry ink on the sheet S. The heating drum 16 has a cylindrical shape and rotates while the sheet S is wound around the outer circumferential surface thereof, and a heating source such as a halogen heater is disposed inside the heating drum 16. A non-contact heating unit such as a hot air generating device that blows hot air to the sheet S can be used as a heating unit to heat the sheet S in addition to a contact heating unit such as the heating drum 16.

The sheet collection device 5 includes a collection roller 17 that winds and collects the sheet S, and a tension adjustment mechanism 18 that adjusts tension applied to the sheet S. The collection roller 17 is rotatable in the direction indicated by arrow R2 illustrated in FIG. 1, and the sheet S is wound in a roll shape around the collection roller 17 as the collection roller 17 rotates. The tension adjustment mechanism 18 includes multiple rollers, similarly to the tension adjustment mechanism 12 of the sheet supply device 1. Some of the multiple rollers move to adjust the tension of the sheet S, and the sheet S is wound up by the collection roller 17 with a constant tension.

The controller 6 includes an information processor such as a personal computer (PC). The controller 6 generates the image data to be formed on the sheet S, and controls various operations of the sheet supply device 1, the image forming device 2, the conveyance device 3, the drying device 4, and the sheet collection device 5. For example, the controller 6 controls the temperatures of the heating source that heats the heating drum 16 in addition to the rotation speeds of the supply roller 11, the collection roller 17, and the conveyance rollers 15.

Figure 3:
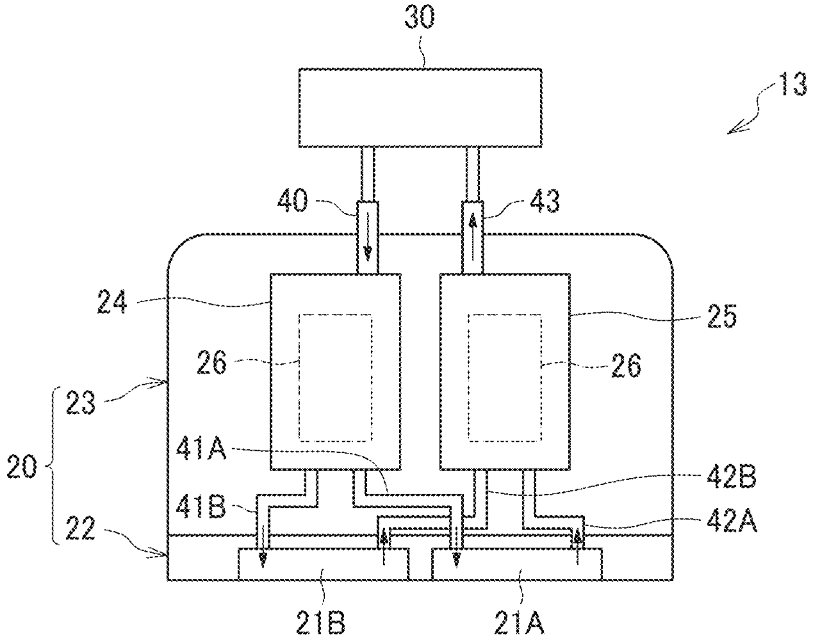
FIG. 3 is a schematic diagram illustrating a configuration of a head unit according to an embodiment of the present disclosure.

FIG. 3 is a schematic diagram illustrating a configuration of the head unit 13 according to the present embodiment. A description is given below of a head unit including a liquid discharge head that discharges ink as a liquid, but embodiments of the present disclosure are not limited thereto.

As illustrated in FIG. 3, the head unit 13 includes a head module 20 having a function of discharging a liquid and a liquid circulation device 30 that circulates the liquid through the head module 20.

The head module 20 includes a sub-module 22 including two liquid discharge heads 21A and 21B and a manifold 23 that distributes and supplies the liquid to the liquid discharge heads 21A and 21B. The liquid discharge heads 21A and 21B may collectively be referred to as liquid discharge heads 21, each of which may be referred to as a liquid discharge head 21 unless distinguished. The number of liquid discharge heads 21 of the sub-module 22 may be three or more.

Figure 4:
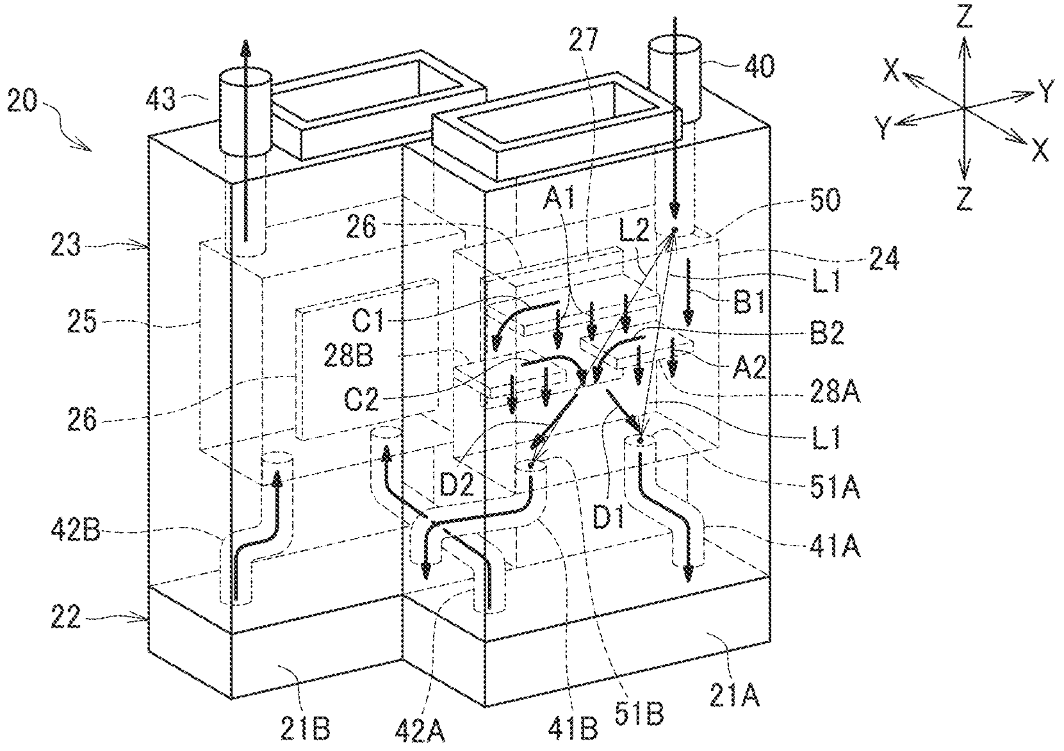
FIG. 4 is a perspective view of a head module according to a first embodiment of the present disclosure.

Each of the liquid discharge heads 21A and 21B has multiple nozzles from which the liquid is discharged in a liquid discharge direction (i.e., a first direction). The multiple nozzles are arranged in a direction orthogonal to a sheet conveyance direction to form nozzle rows, and the nozzle rows are arranged in, for example, two rows in the sheet conveyance direction. The liquid discharge direction is in a direction Z illustrated in FIG. 4. The direction Z may be referred to as the first direction. A direction X in FIG. 4 is intersecting the direction Z (first direction) and may be referred to as a second direction. A direction Y in FIG. 4 is intersecting the direction Z (first direction) and orthogonal to the direction X (second direction) and may be referred to as a third direction. The multiple nozzles are arranged in, for example, the direction Y (third direction).

The manifold 23 includes two tanks (i.e., a supply tank 24 and a collection tank 25) as a liquid storage to store the liquid. The supply tank 24 stores the liquid to be supplied to the liquid discharge heads 21A and 21B, and the collection tank 25 stores the liquid collected from the liquid discharge heads 21A and 21B.

A common supply path 40 is connected to the supply tank 24 via an inlet 50 (see FIG. 4). The common supply path 40 introduces the liquid supplied from the liquid circulation device 30 into the supply tank 24. Two individual supply paths 41A and 41B are connected to the supply tank 24 via outlets 51A and 51B (see FIG. 4). The individual supply paths 41A and 41B supply the liquid from the supply tank 24 to the liquid discharge heads 21A and 21B. A common collection path 43 and two individual collection paths 42A and 42B are connected to the collection tank 25. The individual collection paths 42A and 42B collect the liquid from the liquid discharge heads 21A and 21B to the collection tank 25. The common collection path 43 feeds the liquid from the collection tank 25 to the liquid circulation device 30.

The supply tank 24 and the collection tank 25 are provided with heaters 26 to heat the liquid in the supply tank 24 and the collection tank 25. The heaters 26 contact the outer surfaces of the supply tank 24 and the collection tank 25, respectively, to heat the liquid inside the supply tank 24 and the collection tank 25 through the outer surfaces.

The liquid circulation device 30 includes, for example, a compressor as a positive pressure generator and a vacuum pump as a negative pressure generator. When the liquid is circulated through the liquid discharge heads 21A and 21B, the supply tank 24 is pressurized by the compressor and the collection tank 25 is depressurized by the vacuum pump to generate an internal pressure difference between the supply tank 24 and the collection tank 25. Thus, the liquid is supplied from the liquid circulation device 30 to the liquid discharge heads 21A and 21B via the supply tank 24, and the liquid is collected from the liquid discharge heads 21A and 21B to the liquid circulation device 30 via the collection tank 25. As a result, the liquid is circulated round the head unit 13.

A configuration of a head module according to a comparative example, which is different from the above-described embodiment of the present disclosure, is described below with reference to FIG. 15.

In the comparative example illustrated in FIG. 15, similarly to the above-described embodiment of the present disclosure, a head module 200 includes two liquid discharge heads 210A and 210B to discharge a liquid (e.g., ink), a supply tank 240 to store the liquid to be supplied to the liquid discharge heads 210A and 210B, a collection tank 250 to store the liquid collected from the liquid discharge heads 210A and 210B, and heaters 260 to heat the liquid in the supply tank 240 and the collection tank 250. The supply tank 240 is provided with one common supply path 400 connected to a liquid circulation device and two individual supply paths 410A and 410B connected to the liquid discharge heads 210A and 210B, respectively. The collection tank 250 is provided with two individual collection paths 420A and 420B connected to the liquid discharge heads 210A and 210B, respectively, and one common collection path 430 connected to the liquid circulation device.

Figure 16:
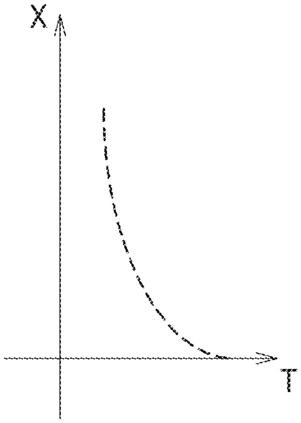
FIG. 16 is a graph illustrating the temperature distribution of ink in a supply tank of the head module of FIG. 15, according to the comparative example.

For example, the heater 260 of the supply tank 240 contacts one surface of the supply tank 240, i.e., a surface on one side in the direction X which is the back side of the supply tank 240 in FIG. 15. Accordingly, the temperature of the ink on one side in the direction X close to the heater 260 is high, and the temperature of the ink on the other side in the direction X is low in the supply tank 240. Thus, in the supply tank 240 illustrated in FIG. 15, as illustrated in FIG. 16, the temperature of the ink (ink temperature T) varies in the direction X. Although the supply tank 240 has been described as an example, the same applies to the collection tank 250.

Due to such variations in the ink temperature in the supply tank 240, the ink temperature is not sufficiently uniformized between the paths through which the ink is supplied from the individual supply paths 410A and 410B to the liquid discharge heads 210A and 210B and the paths through which the ink is distributed to the nozzles. As a result, the temperature of the ink discharged from the nozzles varies. The variations in the ink temperature may cause variations in, for example, the viscosity of the ink to be discharged. Accordingly, the uneven density of the ink and the deviation of landing position of the ink may occur.

Further, in the supply tank 240 illustrated in FIG. 15, lengths L1 and L2 of channels of the ink from an inlet 500 to outlets 510A and 510B are different. As a result, the temperature of the ink supplied to the liquid discharge heads 210A and 210B varies.

Figure 5:
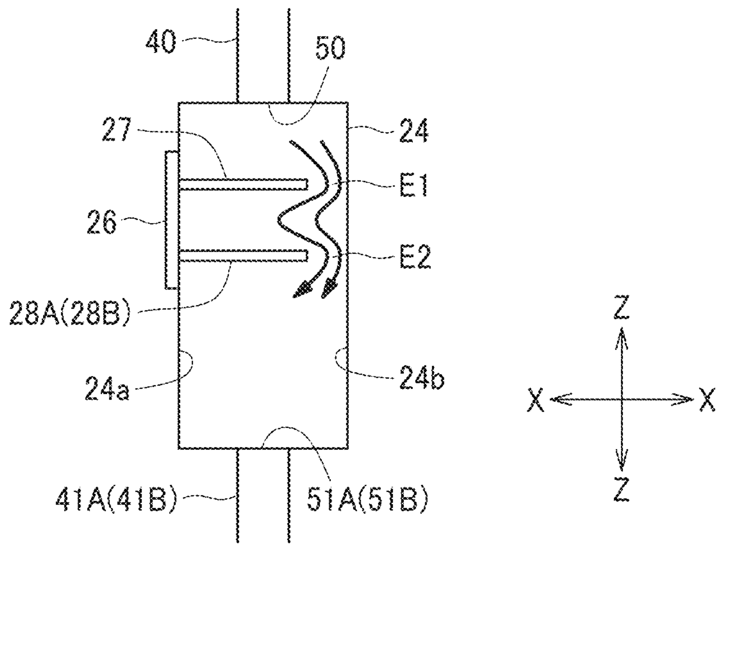
FIG. 5 is a side view of a supply tank of the head module of FIG. 4, according to the first embodiment.
Figure 6:
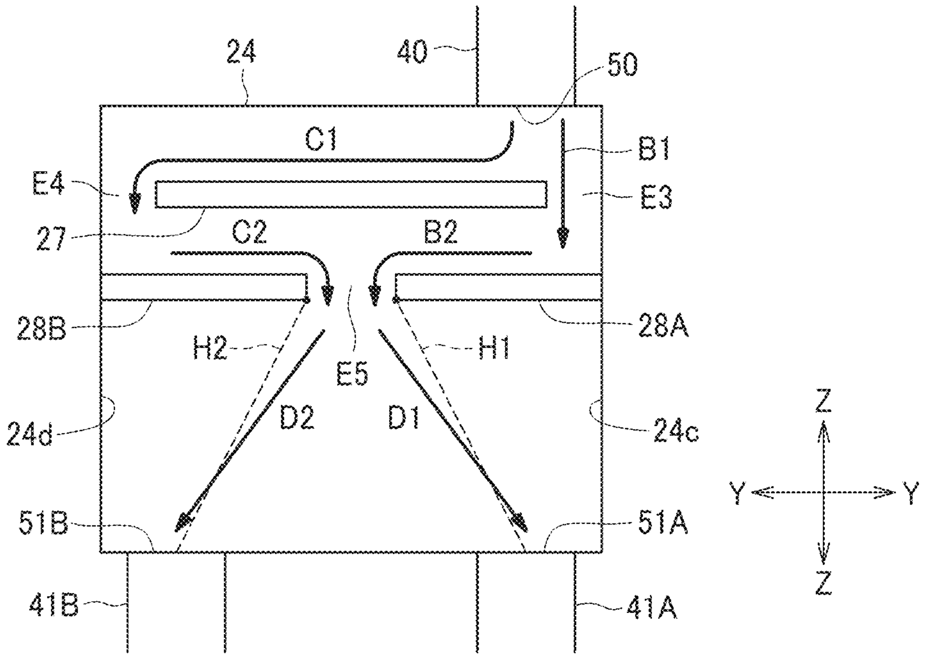
FIG. 6 is a front view of the supply tank of the head module of FIG. 4, according to the first embodiment.
Figure 7:
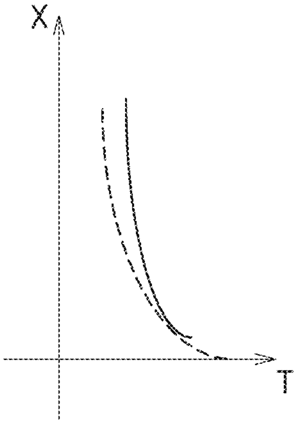
FIG. 7 is a graph illustrating the temperature distribution of ink in the supply tank of FIG. 4, according to the first embodiment.

In view of the above situation, a configuration of the head module according to the present embodiment, which reduces the variations in the ink temperature in the direction X, is described below with reference to FIGS. 4 to 7. FIG. 4 is a perspective view of the head module according to the present embodiment, FIG. 5 is a side view of the supply tank of the head module of FIG. 4, and FIG. 6 is a front view of the supply tank of the head module of FIG. 4. FIG. 7 is a graph illustrating the distribution of the ink temperature T in the direction X. The solid line in FIG. 7 indicates the temperature distribution according to the present embodiment, and the dashed line in FIG. 7 indicates the temperature distribution in the supply tank according to the comparative example of FIG. 15. The directions X, Y, and Z in FIG. 4 are orthogonal to each other.

As illustrated in FIG. 4, a first partition 27 and second partitions 28A and 28B as multiple partitions are disposed in the supply tank 24 according to the present embodiment. The first partition 27 and the second partitions 28A and 28B have a rectangular parallelepiped shape and extend in the direction X (i.e., a partition direction) and the direction Y. The second partitions 28A and 28B are closer to the outlets 51A and 51B in the direction Z than the first partition 27. The second partitions 28A and 28B are disposed at the same position in the Z direction, but the positions of the second partitions 28A and 28B are not limited thereto. The first partition 27 partially overlaps the second partitions 28A and 28B on the X-Y plane.

The heater 26 is disposed on a wall to be heated 24*a* (i.e., a first wall) which is one surface of the supply tank 24 in the direction X. The direction X is the partition direction (i.e., the second direction) according to the present embodiment. The partition direction is also a direction from the wall to be heated 24*a* toward an opposing wall 24*b* (i.e., a second wall), which is the other surface of the supply tank 24, opposite the wall to be heated 24*a*. The heater 26 is disposed on the wall to be heated 24*a*, but may be disposed over a plurality of surfaces (walls).

The inlet 50 is disposed on one face of the supply tank 24 in the direction Z, and the outlets 51A and 51B are disposed on the other face of the supply tank 24 in the direction Z. The outlets 51A and 51B may collectively be referred to as outlets 51, each of which may be referred to as an outlet 51 unless distinguished. The direction Z is a direction from the inlet 50 toward the outlet 51. However, this does not mean only that the direction connecting the inlet 50 and the outlet 51 by a straight line is parallel to the direction Z, but may mean that the inlet 50 is arranged on the one face in the direction Z and the outlet 51 is arranged on the other face and the direction from the inlet 50 to the outlet 51 has a vector in the direction Z, or the direction from the inlet 50 to the outlet 51 mainly has the components of the direction Z among the directions X, Y, and Z. In the present embodiment, the inlet 50 and the outlets 51A and 51B are disposed at different positions on the X-Y plane. The direction Z (i.e., the first direction) is a direction intersecting the direction X (i.e., the second direction), and in particular, a direction orthogonal to the second direction X in the present embodiment.

As illustrated in FIG. 5, the first partition 27 and the second partitions 28A and 28B are in contact with the wall to be heated 24*a* of the supply tank 24, and have gaps E1 and E2 adjacent to the opposing wall 24*b* opposite the wall to be heated 24*a*. However, the first partition 27 and the second partitions 28A and 28B are not necessarily in contact with the wall to be heated 24*a*.

When ink is supplied from the common supply path 40 to the supply tank 24 according to the present embodiment through the inlet 50, a part of the ink flows in the direction Z along the opposing wall 24*b* indicated by arrows A1 and A2 illustrated in FIG. 4, and flows toward the individual supply paths 41A and 41B. At this time, as illustrated in FIG. 5, when viewed in the direction Z, which is the vertical direction in FIG. 5, the channel of the ink is temporarily narrowed in the direction X by the first partition 27, widened between the first partition 27 and the second partitions 28A and 28B, narrowed again in the direction X at the position of the second partitions 28A and 28B, and then widened again. In other words, the supply tank 24 includes the channel of the ink having a first narrow portion formed by a gap E1, a wide portion between the gap E1 and a gap E2 where the partition is not disposed, and a second narrow portion formed by the gap E2 in this order in the direction Z from the inlet 50 toward the outlet 51. Thus, the channel has narrow portions and wide portions in the direction X, which alternately repeat in the direction Z. As a result, the ink flows in the channel in the direction Z while meandering in the direction X as illustrated in FIG. 5. Thus, the ink in the supply tank 24 can be stirred in the direction X. As described above, the ink temperature varies in the direction X, i.e., the ink temperature increases toward the heater 26 in the direction X in the supply tank 24. For this reason, the ink is stirred in the direction X to reduce the variations in the ink temperature in the supply tank 24. As a result, the variations in the temperature of the ink supplied from the individual supply paths 41A and 41B to the liquid discharge heads 21A and 21B can be reduced. Accordingly, the variations in the temperature of the ink discharged from the liquid discharge head 21A and 21B, the uneven density of the ink, and the deviation of landing position of the discharged ink can be reduced. Such a configuration can be implemented by a simple configuration without multiple heaters 26. The terms “having a first narrow portion, a wide portion, and a second narrow portion in this order” may mean that there is another portion between these three portions.

Specifically, in the temperature distribution illustrated in FIG. 7, the configuration of the supply tank 24 according to the present embodiment can reduce the variations in the temperature in the direction X in the supply tank as indicated by the solid line in FIG. 7 as compared with the supply tank 240 (see FIG. 15) indicated by the dashed line in FIG. 7. In other words, due to the channel meandering along the opposing wall 24*b* of the supply tank 24, the temperature indicated by the solid line is higher than that indicated by the dashed line, in particular, on the opposing wall 24*b* side (upper side in FIG. 7).

In the supply tank 24 according to the present embodiment, the ink flows in the direction Y in another channel along the first partition 27 and the second partitions 28A and 28B in addition to in the direction Z in the above-described channel along the opposing wall 24*b*. This channel is described below.

As illustrated in FIG. 6, the first partition 27 has clearances E3 and E4 between the first partition 27 and both side walls 24*c* and 24*d* of the supply tank 24 in the direction Y. For the sake of convenience, a space between the partition and wall in the direction X is referred to as the gap and a space between the partition and wall in the direction Y (i.e., the third direction) is referred to as the clearance. The second partition 28A is in contact with the side wall 24*c* of the supply tank 24, and the second partition 28B is in contact with the side wall 24*d* of the supply tank 24. A clearance E5 is disposed between the second partition 28A and the second partition 28B. The clearances E3 to E5 are disposed across the entire supply tank 24 in the direction X (see FIG. 4), but are not necessarily limited thereto.

In the supply tank 24 according to the present embodiment, when the ink is supplied from the common supply path 40, a part of the ink flows in the direction Z through the clearance E3 as indicated by arrow B1, then flows in the direction Y along the second partition 28A as indicated by arrow B2, and flows toward the individual supply paths 41A and 41B through the clearance E5 as indicated by arrows D1 and D2. Further, another part of the ink flows in the direction Y along the first partition 27 as indicated by arrow C1, and then turns back and flows in the direction opposite to the direction Y along the second partition 28B as indicated by arrow C2. Then, the ink flows to the individual supply paths 41A and 41B through the clearance E5 as indicated by arrows D1 and D2.

As described above, the ink flows along the first partition 27 or the second partitions 28A and 28B. Accordingly, the route of the ink flowing from the inlet 50, through which the ink is supplied into the supply tank 24 from the common supply path 40, to the outlets 51A and 51B, through which the ink is fed to the individual supply paths 41A and 41B, in the supply tank 24 can be lengthened. As a result, the variations in the temperature of the discharged ink can be reduced. Further, the clearances E3 and E4 are disposed on both sides of the first partition 27 in the direction Y. As a result, the ink flows in the channels in the supply tank 24 without dead end, and can be efficiently fed to the individual supply paths 41A and 41B. In addition, the purge of air bubbles in the ink and the heating of the ink can be efficiently performed.

In the present embodiment, the distances from the clearance E5 to the individual supply paths 41A and 41B are equal to each other. More specifically, on the plane of the sheet on which FIG. 6 is drawn, which is orthogonal to the direction X, a distance H1 from the end (in particular, the edge) of the second partition 28A to the center of the outlet 51A is equal to a distance H2 from the end (in particular, the edge) of the second partition 28B to the center of the outlet 51B. Accordingly, the difference between the distances H1 and H2 of the channels to the individual supply paths 41A and 41B is reduced. As a result, the variations in the temperature of the ink flowing to the individual supply paths 41A and 41B can be reduced. However, the clearances E3, E4, and E5 are not necessarily disposed at the positions described in the present embodiment.

The first partition 27 and the second partitions 28A and 28B are preferably formed of a material having a high thermal conductivity, and for example, are preferably formed of a material having a higher thermal conductivity than the wall faces (e.g., the wall to be heated 24*a*, the opposing wall 24*b*, and the side walls 24*c* and 24*d*) of the supply tank 24. Such a configuration can facilitate heat transfer along the first partition 27 or the second partitions 28A and 28B, and thus the heat by the heater 26 can be efficiently transferred to the opposite side. Accordingly, the variations in the temperature in the direction X can be reduced. In addition, the ink can be efficiently heated.

A supply tank 24 according to modifications of the present embodiment is described below.

Figure 8:
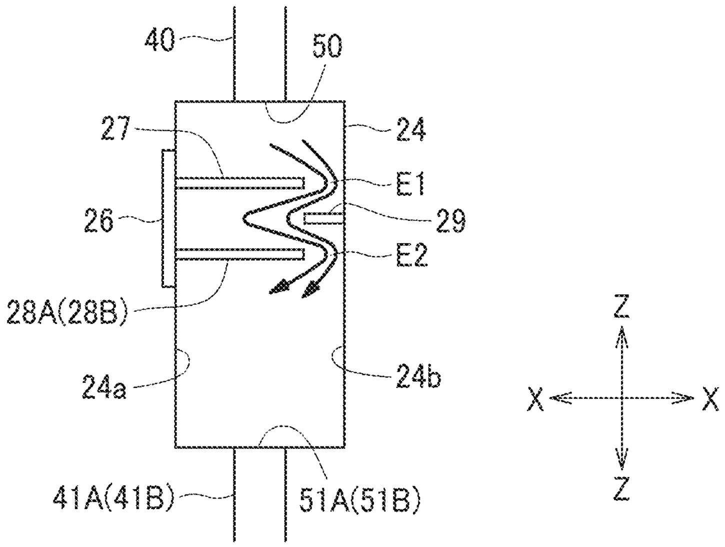
FIG. 8 is a side view of a supply tank of a head module according to a second embodiment of the present disclosure.

In an embodiment of the present disclosure illustrated in FIG. 8, an opposite partition 29 is disposed between the first partition 27 and the second partitions 28A and 28B in the direction Z. The opposite partition 29 is in contact with the opposing wall 24*b* of the supply tank 24. The end, opposite the opposing wall 24*b*, of the opposite partition 29 is disposed near the end of the first partition 27 or the second partitions 28A and 28B in the direction X, and may be disposed at the same position in the direction X. However, the position of the end of the opposite partition 29 is not limited thereto. For example, the position of the end of the opposite partition 29 may be to the left or to the right of the end of the first partition 27 or the second partitions 28A and 28B in FIG. 8. The opposite partition 29 extending in the direction X is disposed across the entire supply tank 24 in the direction Y, but is not limited thereto. The ink flowing in the direction Z along the opposing wall 24*b* passes over the first partition 27, and then is blocked by the opposite partition 29. Accordingly, the ink is likely to flow to the left in FIG. 8, i.e., toward the wall to be heated 24*a*. Thus, the opposite partition 29 causes the channel of the ink along the opposing wall 24*b* to meander more largely to transfer heat in the direction X more efficiently. As a result, the variations in the temperature of the ink in the direction X can be further reduced.

Figure 9:
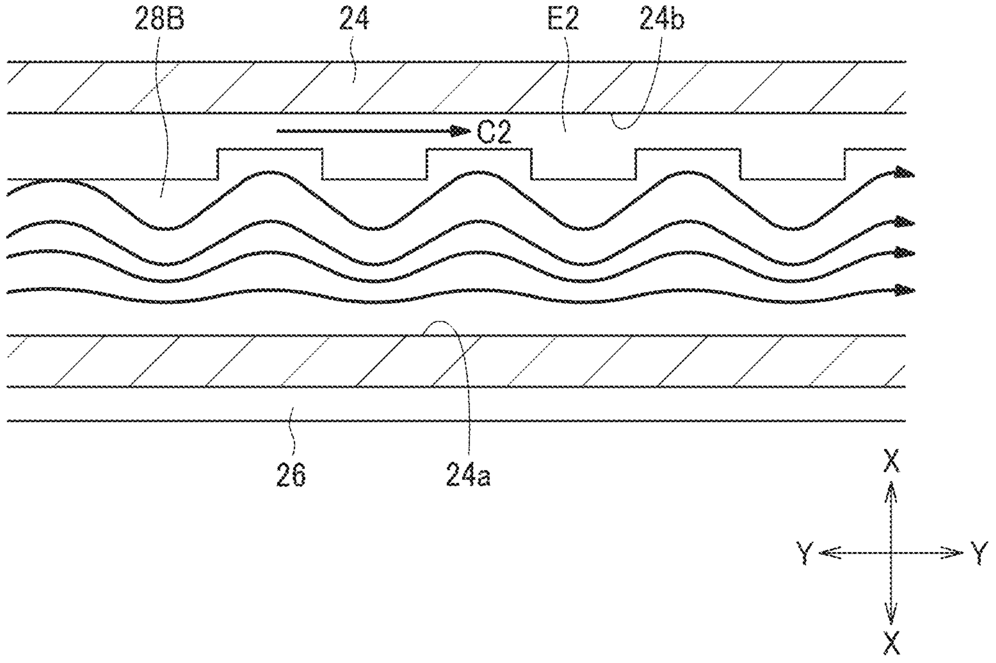
FIG. 9 is a partial plan view of a supply tank of a head module according to a third embodiment of the present disclosure.

In an embodiment of the present disclosure illustrated in FIG. 9, the length of the second partition 28B in the direction X is not constant but varies in the direction Y. In other words, the width of the gap E2 between the second partition 28B and the opposing wall 24*b* of the supply tank 24 in the direction X is not constant in the direction Y. Accordingly, when the ink flows in the direction indicated by arrow C2 in FIG. 9 along the second partition 28B, the ink undulates in the direction X. Due to such a configuration, the ink is more likely to be stirred in the direction X to reduce the variations in the temperature of the ink. In particular, the second partition 28B according to the present embodiment has projections and recesses alternately arranged in the direction Y (i.e., the third direction). The projections are longer than the recesses in the direction X. In other words, the second partition 28B has the projections and the recesses having the gap E2 repeatedly increasing and decreasing in the direction Y. As a result, the ink flowing in the direction indicated by arrow C2 meanders as illustrated in FIG. 9 to stir the ink more efficiently. The same configuration can be adopted for the second partition 28A, and only one of the second partitions 28A and 28B may have such a configuration. The shape of the second partition 28B is not limited to the above-described shape in which the projections and the recesses are repeated, and may be a shape having a step only at one position.

Figure 10:
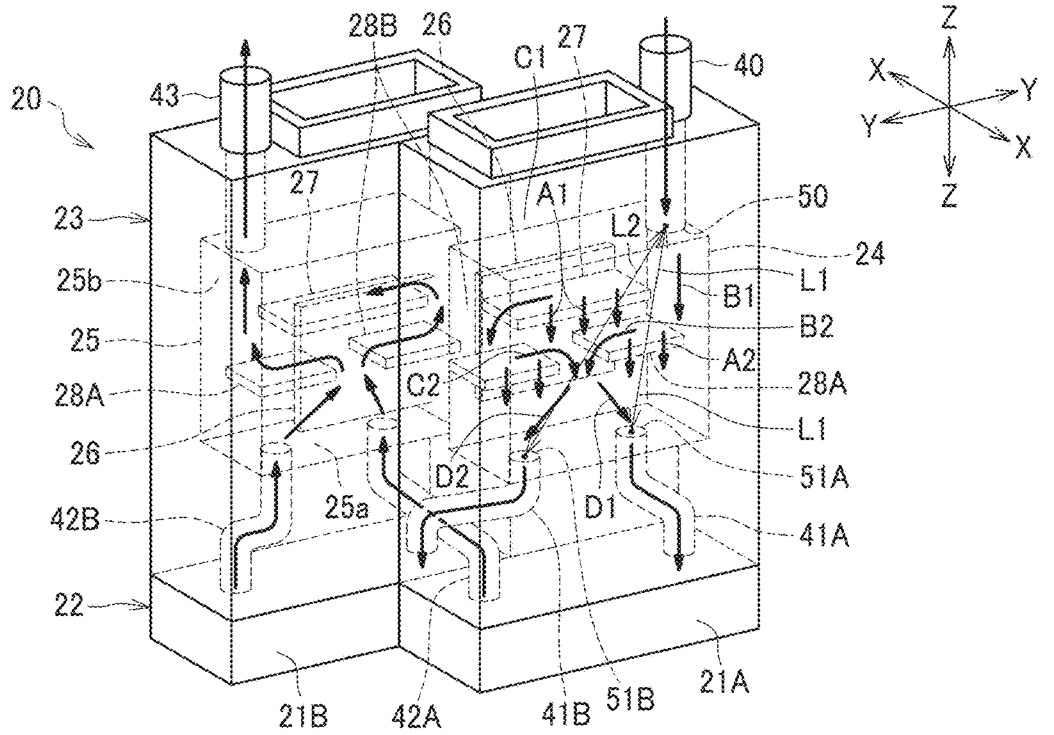
FIG. 10 is a perspective view of a head module according to a fourth embodiment of the present disclosure.

As in an embodiment of the present disclosure illustrated in FIG. 10, the first partition 27 and the second partitions 28A and 28B may be disposed not only in the supply tank 24 but also in the collection tank 25. Due to such a configuration, the flow of the ink in the direction opposite to that in the above-described embodiment can be formed from the individual collection paths 42A and 42B to the common collection path 43. Specifically, the channel meandering along an opposing wall 25*b*, which is disposed opposite a wall to be heated 25*a* by the heater 26, can be formed in the direction Z. Accordingly, the variations in the temperature of the ink in the direction X can be reduced in the collection tank 25. In addition, the channels through which the ink flows along the second partitions 28A and 28B and the first partition 27 can be formed. Accordingly, the channel can be made sufficiently long, and the ink can be sufficiently heated. Further, the difference between the lengths of the channels from the individual collection paths 42A and 42B to the common collection path 43 can be reduced. The same effect can be obtained even when the circulation direction of the ink is reversed. The circulation direction of the ink in the head module 20 can be changed in accordance with, for example, the apparatus layout to enhance versatility. Further, the same effect can be obtained even when the ink is supplied from the common supply path 40 and the common collection path 43 without the circulation of the ink to discharge the ink.

Figure 11:
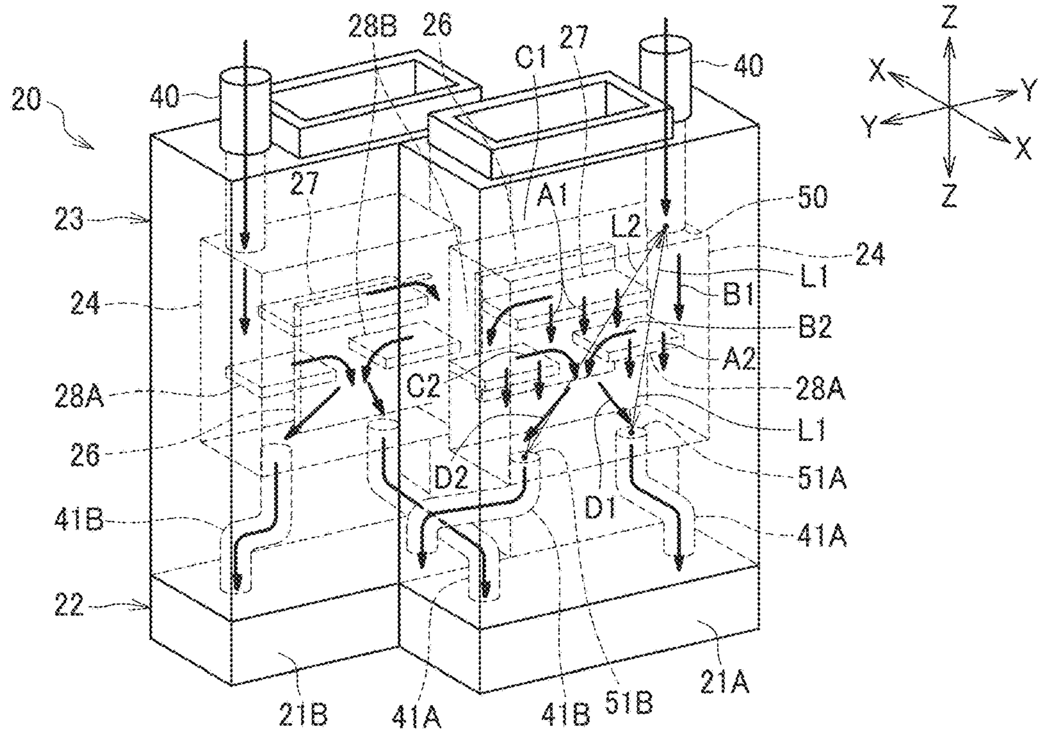
FIG. 11 is a perspective view of a head module according to a fifth embodiment of the present disclosure.
Figure 12:
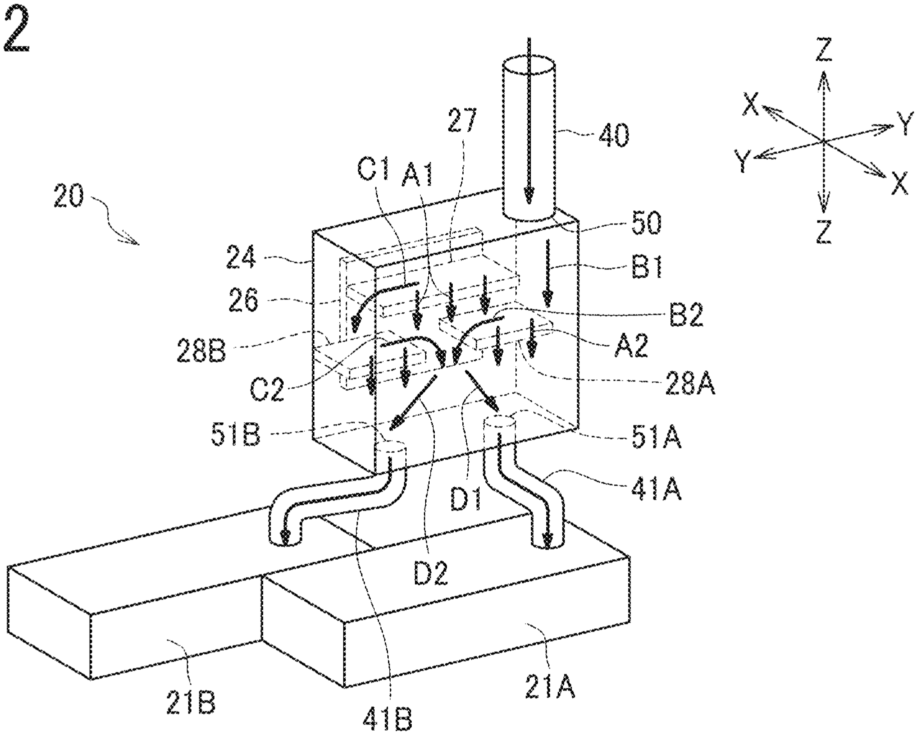
FIG. 12 is a perspective view of a head module according to a sixth embodiment of the present disclosure.
Figure 13:
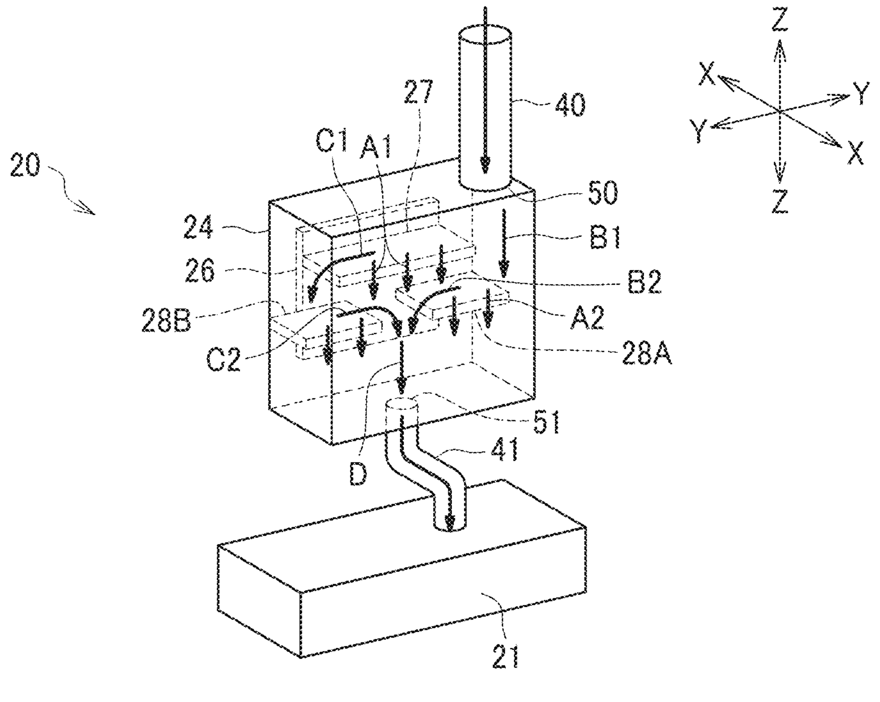
FIG. 13 is a perspective view of a head module according to a seventh embodiment of the present disclosure.

Further, embodiments of the present disclosure are not limited to a circulation type head module, and may be applied to a non-circulation type head module which does not collect the liquid from the liquid discharge head. For example, the head module 20 illustrated in FIG. 11 has two supply tanks 24, and the first partition 27 and the second partitions 28A and 28B are disposed in both of the supply tanks 24. However, the first partition 27 and the second partitions 28A and 28B may be disposed in any one of the supply tanks 24. As illustrated in FIG. 12, the head module 20 may include only one supply tank 24. Alternatively, as illustrated in FIG. 13, the supply tank 24 supplies ink to only one liquid discharge head 21. Due to these supply tanks 24, the variations in the temperature of the ink can be reduced.

In an embodiment of the present disclosure illustrated in FIG. 14, the first partition 27 and the second partitions 28A and 28B have gaps E6 and E7 adjacent to the wall to be heated 24*a* by the heater 26, not adjacent to the opposing wall 24*b* of the supply tank 24. Accordingly, the channel of the ink flowing in the direction Z while meandering in the direction X can be formed along the wall to be heated 24*a*. As a result, the ink is stirred in the direction X, and the variations in the temperature of the ink in the direction X can be reduced in the supply tank 24. For example, the arrangement of the first partition 27 and the second partitions 28A and 28B in the direction Y is the same as that in FIG. 6, but is not limited thereto.

The configurations in the above embodiments described with reference to, for example, FIGS. 4, 6, 8, and 9 can be appropriately adopted in the embodiments illustrated in FIGS. 10 to 14. Further, these configurations illustrated in FIGS. 4, 6, 8, and 9 may be used in combination.

Although the preferred embodiments of the present disclosure have been described above, the present disclosure is not limited to the embodiments described above. Numerous additional modifications and variations are possible in light of the above teachings. It is therefore to be understood that within the scope of the appended claims.

In the above description, for example, the supply tank 24 as the liquid storage is disposed separately from the liquid discharge head. Alternatively, the liquid storage may be disposed in the liquid discharge head.

The partition is not limited to the rectangular parallelepiped shape as described in the above embodiments, and may have any appropriate shape that forms a gap between the partition and the wall of the liquid storage.

Embodiments of the present disclosure are not limited to a head module mounted on an inkjet image forming apparatus which serves as a liquid discharge apparatus, and can be applied to a head module mounted on other liquid discharge apparatuses.

In embodiments of the present disclosure, the "liquid discharge apparatus" represents an apparatus that includes a liquid discharge unit and drives the liquid discharge unit to discharge liquid onto an object such as a sheet. The "liquid discharge apparatus" may further include devices relating to feeding, conveying, and ejecting of the object and also include a pretreatment device and an aftertreatment device.

In the "liquid discharge apparatus" according to embodiments of the present disclosure, the liquid discharge unit may move relative to the sheet, or may not move relative to the sheet. For example, the "liquid discharge apparatus" may be a serial head apparatus that moves the liquid discharge head (unit) or a line head apparatus that does not move the liquid discharge head (unit).

The "liquid discharge apparatus" is not limited to an apparatus that discharges liquid to visualize meaningful images such as characters or figures. For example, the "liquid discharge apparatus" may be an apparatus that forms patterns having no meaning or an apparatus that fabricates three-dimensional images. The "liquid discharge apparatus" further includes, for example, a treatment-liquid discharge apparatus that discharges treatment liquid onto the surface of a sheet for the purposes of, for example, reforming the surface of the sheet.

The "sheet" according to the above embodiments of the present disclosure is an object to which liquid can at least temporarily adhere, and includes, for example, a sheet to which liquid adheres and is fixed and a sheet to which liquid adheres and permeates. Specific examples of the sheet include a recording medium such as a sheet of paper, a recording sheet, a film, and cloth, and an electronic substrate. The "sheet" is not limited to the long continuous sheet (rolled sheet) as described above, and may be a sheet (cut sheet) cut into a predetermined size in the sheet conveyance direction.

Examples of the material of the "sheet" include any materials to which liquid can adhere even temporarily, such as paper, thread, fiber, fabric, leather, metal, plastic, glass, wood, and ceramic.

The "liquid" to be discharged from the "liquid discharge apparatus" according to embodiments of the present disclosure is not limited to a particular liquid as long as the liquid has a viscosity or surface tension to be discharged from a liquid discharge unit (liquid discharge head). However, preferably, the viscosity of the liquid is not greater than 30 mPa's under ordinary temperature and ordinary pressure or by heating or cooling. Specifically, examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as deoxyribonucleic acid (DNA), amino acid, protein, or calcium, or an edible material, such as a natural colorant. Such a solution, a suspension, or an emulsion can be used for, e.g., inkjet ink, surface treatment solution, a liquid for forming components of electronic element or light-emitting element or a resist pattern of electronic circuit, a material solution for three-dimensional fabrication, or an edible ink.

Aspects of the present disclosure are, for example, as follows.

Aspect 1

A head module includes a liquid discharge head to discharge a liquid. The head module further includes a storage unit to store the liquid and a heating member disposed on one surface of the storage unit to heat the liquid in the storage unit. The storage unit includes an inlet portion to introduce the liquid into the storage unit, an outlet portion to sends the liquid in the storage unit to the liquid discharge head, and multiple partitions. A direction from the one surface of the storage unit on which the heating member is disposed toward the other surface of the storage unit opposed to the one surface is defined as a partition direction (second direction). The partition extends in the partition direction (second direction) and has a gap between the partition and the other surface of the storage unit opposed to the one surface. The partitions are arranged at intervals in a direction intersecting the partition direction (second direction).

In other words, a head module includes a liquid discharge head, a liquid storage, and a heater. The liquid discharge head discharges a liquid in a first direction. The liquid storage is coupled to the liquid discharge head to store the liquid to be fed to the liquid discharge head. The liquid storage includes a first wall, a second wall opposite the first wall in a second direction intersecting the first direction, an inlet on one end of the liquid storage in the first direction, an outlet on another end of the liquid storage in the first direction, and multiple partitions. The inlet introduces the liquid to the liquid storage in the first direction. The outlet is coupled to the liquid discharge head to feed the liquid from the liquid storage to the liquid discharge head in the first direction. The multiple partitions extend from the first wall toward the second wall in the second direction with gaps between tips of the multiple partitions and the second wall in the second direction, respectively. The multiple partitions are arranged at intervals in the first direction. The heater is disposed on the first wall to heat the liquid in the liquid storage.

Aspect 2

In the head module according to Aspect 1, the partition is formed of a material having a higher thermal conductivity than a wall surface of the storage unit.

In other words, the multiple partitions have a higher thermal conductivity than the first wall.

Aspect 3

In the head module according to Aspect 1 or 2, a width of the gap between the partition and a wall surface of the storage unit in the partition direction (second direction) is different depending on a location.

In other words, the gaps in the second direction are different at positions in a third direction intersecting the first direction and orthogonal to the second direction.

Aspect 4

In the head module according to Aspect 3, the partition has an uneven shape in which the width of the gap in the partition direction (second direction) repeatedly increases and decreases in a direction orthogonal to the partition direction (second direction) on the other surface side.

In other words, at least one of the multiple partitions has projections each having a first gap in the second direction and recesses each having a second gap larger than the first gap in the second direction. The projections and the recesses are alternately arranged in the third direction.

Aspect 5

The head module according to any one of Aspects 1 to 4, further includes a reverse side partition which is in contact with the other surface and extends in the partition direction (second direction) between the partitions in a direction intersecting the partition direction (second direction).

In other words, the liquid storage further includes an opposite partition extending from the second wall toward the first wall in a negative second direction opposite to the second direction between the multiple partitions in the first direction.

Aspect 6

In the head module according to any one of Aspects 1 to 5, the storage unit includes at least two outlet portions. Two partitions, which are closest to the outlet portions among the multiple partitions in a direction intersecting the partition direction (second direction), are disposed with a clearance therebetween. Distances from the two outlet portions to the corresponding closer partitions are equal to each other.

In other words, the liquid storage further includes at least two outlets including the outlet. An extreme downstream partition of the multiple partitions in the first direction includes two partition portions separated from each other with a clearance between the two partition portions in a third direction intersecting the first direction and orthogonal to the second direction. Distances from the at least two outlets to the clearance are equal to each other.

Aspect 7

A head module includes a liquid discharge head to discharge a liquid. The head module further includes a storage unit to store the liquid and a heating member disposed on one surface of the storage unit to heat the liquid in the storage unit. The storage unit includes an inlet portion to introduce the liquid into the storage unit and an outlet portion to sends the liquid in the storage unit to the liquid discharge head. A direction from the one surface of the storage unit on which the heating member is disposed toward the other surface of the storage unit opposed to the one surface is defined as a partition direction (second direction). The storage unit includes a channel having a first narrow portion, a wide portion having a width in the partition direction (second direction) wider than the first narrow portion, and a second narrow portion having a width in the partition direction (second direction) narrower than the wide portion in this order.

In other words, a head module includes a liquid discharge head, a liquid storage, and a heater. The liquid discharge head discharges a liquid in a first direction. The liquid storage is coupled to the liquid discharge head to store the liquid to be fed to the liquid discharge head. The liquid storage includes a first wall, a second wall opposite the first wall in a second direction intersecting the first direction, an inlet on one end of the liquid storage in the first direction, an outlet on another end of the liquid storage in the first direction, and a channel in which the liquid flows from the inlet toward the outlet in the liquid storage in the first direction. The inlet introduces the liquid to the liquid storage in the first direction. The outlet is coupled to the liquid discharge head to feed the liquid from the liquid storage to the liquid discharge head in the first direction. The channel has a first narrow portion, a wide portion wider than the first narrow portion in the second direction, and a second narrow portion narrower than the wide portion in the second direction, arranged in order of the first narrow portion, the wide portion, and the second narrow portion in the first direction. The heater is disposed on the first wall to heat the liquid in the liquid storage.

Aspect 8

In the head module according to Aspect 7, the storage unit includes a first partition and a second partition. The first narrow portion is formed as a gap between the first partition and the other surface of the storage unit. The second narrow portion is formed as a gap between the second partition and the other surface of the storage unit. The wide portion is formed as a space between the first partition and the second partition in a direction from the inlet portion toward the outlet portion.

In other words, the liquid storage further includes a first partition having a gap between a tip of the first partition and the second wall in the second direction to form the first narrow portion and a second partition having a gap between a tip of the second partition and the second wall in the second direction to form the second narrow portion. The wide portion is formed in a space between the first partition and the second partition in the first direction.

Aspect 9

In the head module according to Aspect 7, the storage unit includes a first partition and a second partition. The first narrow portion is formed as a gap between the first partition and the one surface of the storage unit. The second narrow portion is formed as a gap between the second partition and the one surface of the storage unit. The wide portion is formed as a space between the first partition and the second partition in a direction from the inlet portion toward the outlet portion.

In other words, the liquid storage further includes a first partition having a gap between a tip of the first partition and the first wall in the second direction to form the first narrow portion and a second partition having a gap between a tip of the second partition and the first wall in the second direction to form the second narrow portion. The wide portion is formed in a space between the first partition and the second partition in the first direction.

Aspect 10

A liquid discharge apparatus includes the head module according to any one of Aspects 1 to 9.

In other words, a liquid discharge apparatus includes the head module according to any one of Aspects 1 to 9, to discharge the liquid onto an object and a conveyance device to convey the object to the head module.

As described above, according to one aspect of the present disclosure, the variation in the temperature of the liquid supplied from the liquid storage can be reduced with a relatively simple configuration.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A head module comprising:

a liquid discharge head to discharge a liquid in a first direction;

a liquid storage coupled to the liquid discharge head to store the liquid to be fed to the liquid discharge head, the liquid storage including:

a first wall;

a second wall opposite the first wall in a second direction intersecting the first direction;

an inlet on one end of the liquid storage in the first direction, the inlet to introduce the liquid to the liquid storage in the first direction;

an outlet on another end of the liquid storage in the first direction and coupled to the liquid discharge head to feed the liquid from the liquid storage to the liquid discharge head in the first direction; and multiple partitions:

extending from the first wall toward the second wall in the second direction with gaps between tips of the multiple partitions and the second wall in the second direction, respectively; and arranged at intervals in the first direction; and a heater on the first wall, to heat the liquid in the liquid storage.

2. The head module according to claim 1, wherein the multiple partitions have a higher thermal conductivity than the first wall.

3. The head module according to claim 1, wherein the gaps in the second direction are different at positions in a third direction intersecting the first direction and orthogonal to the second direction.

4. The head module according to claim 3, wherein at least one of the multiple partitions has:

projections each having a first gap in the second direction; and recesses each having a second gap larger than the first gap in the second direction, and the projections and the recesses are alternately arranged in the third direction.

5. The head module according to claim 1, wherein the liquid storage further includes an opposite partition extending from the second wall toward the first wall in a negative second direction opposite to the second direction between the multiple partitions in the first direction.

6. The head module according to claim 1, wherein the liquid storage further includes at least two outlets including the outlet, an extreme downstream partition of the multiple partitions in the first direction includes two partition portions separated from each other with a clearance between the two partition portions in a third direction intersecting the first direction and orthogonal to the second direction, and distances from the at least two outlets to the clearance are equal to each other.

7. A liquid discharge apparatus comprising:

the head module according to claim 1, to discharge the liquid onto an object; and a conveyance device to convey the object to the head module.

8. A head module comprising:

a liquid discharge head to discharge a liquid in a first direction;

a liquid storage coupled to the liquid discharge head to store the liquid to be fed to the liquid discharge head, the liquid storage including:

a first wall;

a second wall opposite the first wall in a second direction intersecting the first direction;

an inlet on one end of the liquid storage in the first direction, the inlet to introduce the liquid to the liquid storage in the first direction;

an outlet on another end of the liquid storage in the first direction and coupled to the liquid discharge head to feed the liquid from the liquid storage to the liquid discharge head; and a channel in which the liquid flows from the inlet toward the outlet in the liquid storage in the first direction, the channel having:

a first narrow portion;

a wide portion wider than the first narrow portion in the second direction; and a second narrow portion narrower than the wide portion in the second direction, arranged in order of the first narrow portion, the wide portion, and the second narrow portion in the first direction; and a heater on the first wall, to heat the liquid in the liquid storage.

9. The head module according to claim 8, wherein the liquid storage further includes:

a first partition having a gap between a tip of the first partition and the second wall in the second direction to form the first narrow portion; and a second partition having a gap between a tip of the second partition and the second wall in the second direction to form the second narrow portion, and the wide portion is formed in a space between the first partition and the second partition in the first direction.

10. The head module according to claim 8, wherein the liquid storage further includes:

a first partition having a gap between a tip of the first partition and the first wall in the second direction to form the first narrow portion; and a second partition having a gap between a tip of the second partition and the first wall in the second direction to form the second narrow portion, and the wide portion is formed in a space between the first partition and the second partition in the first direction.

* * * * *